US010108582B2

(12) United States Patent
Hassan et al.

(10) Patent No.: US 10,108,582 B2
(45) Date of Patent: Oct. 23, 2018

(54) DETECTING AN EVENT FROM TIME-SERIES DATA SEQUENCES

(71) Applicant: Tata Consultancy Services Limited, Mumbai, Maharashtra (IN)

(72) Inventors: Ehtesham Hassan, Haryana (IN); Puneet Agarwal, Uttar Pradesh (IN); Guatam Shroff, Haryana (IN)

(73) Assignee: TATA CONSULTANCY SERVICES LIMITED, Maharashtra (IN)

( * ) Notice: Subject to any disclaimer, the term of this patent is extended or adjusted under 35 U.S.C. 154(b) by 346 days.

(21) Appl. No.: 14/749,881

(22) Filed: Jun. 25, 2015

(65) Prior Publication Data

US 2015/0378963 A1   Dec. 31, 2015

(30) Foreign Application Priority Data

Jun. 26, 2014   (IN) .......................... 2074/MUM/2014

(51) Int. Cl.
*G06F 17/18*   (2006.01)
*G06F 17/16*   (2006.01)
*G07C 5/08*   (2006.01)

(52) U.S. Cl.
CPC .............. *G06F 17/18* (2013.01); *G06F 17/16* (2013.01); *G07C 5/0808* (2013.01)

(58) Field of Classification Search
CPC ....................................................... G06F 15/04
See application file for complete search history.

(56) References Cited

U.S. PATENT DOCUMENTS

| 7,706,965 B2 | 4/2010 | Downs et al. |
| 2013/0148817 A1 | 6/2013 | Moriya et al. |

FOREIGN PATENT DOCUMENTS

| JP | 2005018304 A | 1/2005 |
| JP | 2007198803 A | 8/2007 |
| JP | 2010078467 A | 4/2010 |

OTHER PUBLICATIONS

Jessica Lin and Yuan Li: "Finding Structural Similarity in Time Series Data Using Bag-of-Patterns Representation"; NCS 5566; pp. 461-477; 2009; http://cs.gmu.edu/~jessica/Lin_BOP_SSDBM.pdf.
Lei Chen and M. Tamer Özsu: "Using Multi-Scale Histograms to Answer Pattern Existence and Shape Match Queries over Time Series Data"; University of Waterloo; School of Computer Science; 10 pages; 2005.

*Primary Examiner* — Cheung Lee
(74) *Attorney, Agent, or Firm* — Shumaker, Loop & Kendrick, LLP

(57) ABSTRACT

The present subject matter discloses a system and a method for detecting an event from time-series data sequences. The system receives time-series data sequences generated by sensors, wherein the time-series data sequences comprise sample points. The system pairs the sample points with one another for determining pairs of the sample points. The system computes Euclidean distances and angles between the sample points for determining distance matrix and angle matrix corresponding to the sample points. Further, the system determines global distribution of the plurality of pairs of sample points, wherein the global distribution of the plurality of pairs of sample points represent 2D shape histogram for the time-series data sequence. Further, the system concatenates the 2D shape histogram for each time-series data sequence to generate a concatenated shape histogram. Finally the system matches the concatenated shape histogram to pre-stored shape histograms for determining the event.

17 Claims, 11 Drawing Sheets ns such that each
sample point is paired with one another. Further, the matrix computing module may compute a distance matrix (D) and an angle matrix (A) for one or more pairs of the sample points of the plurality of pairs of sample points. Further, the HGED module may generate a two-dimensional (2D) shape histogram for the time-series data sequences using the distance matrix (D) and the angle matrix (A). The 2D shape histogram may be of constant dimension and may represent a global distribution of the plurality of pairs of sample points. The global distribution of the plurality of pairs of sample points is computed using the distance matrix (D) and the angle matrix (A). The HGED module further may concatenate the 2D shape histograms for one or more time-series data sequences based on the timestamp information to generate a concatenated shape histogram. Further, the HGED module may match the concatenated shape histogram with a pre-stored set of shape histograms to detect an event. The pre-stored set of shape histograms may comprise shape histograms corresponding to a relevant event.

In another implementation, a method for detecting an event from time-series data sequences is disclosed. The method may comprise a step of receiving the time-series data sequences of variable lengths generated by a plurality of sensors, wherein the time-series data sequences may comprise timestamp information. The method may comprise sampling the time-series data sequences at a uniform sampling rate for generating sample points. The method may further comprise generating a plurality of pairs of sample points using the sample points. The plurality of pairs of sample points are generated by pairing each sample point with one another. The method may further comprise computing a distance matrix (D) and an angle matrix (A) for one or more pairs of the sample points of the plurality of pairs of sample points. The method may further comprise generating two-dimensional (2D) shape histogram for the time-series data sequence using the distance matrix (D) and the angle matrix (A). The 2D shape histogram is having a constant dimension, and the 2D shape histogram represents global distribution of the plurality of pairs of sample points, and wherein the global distribution of the plurality of pairs of sample points is computed using the distance matrix (D) and the angle matrix (A). The method may further comprise concatenating 2D shape histograms, based on the timestamp information, for one or more time-series data sequence generated by the plurality of sensors, to generate a concatenated shape histogram. The method may further comprise matching the concatenated shape histogram with a pre-stored set of shape histograms to detect an event, wherein the pre-stored set of shape histograms comprise shape histograms corresponding to a relevant event. Further, the receiving, the generating, the computing, the concatenating and the matching are performed by a processor.

Yet in another implementation, a non-transitory computer readable medium embodying a program executable in a computing device for detecting an event from time-series data sequences is disclosed. The program comprises a program code for receiving the time-series data sequences of variable lengths generated by a plurality of sensors, wherein the time-series data sequences comprise timestamp information. The program comprises a program code for sampling the time-series data sequences at a uniform sampling rate, wherein the time-series data sequences are sampled for generating sample points. The program further comprises a program code for generating a plurality of pairs of sample points using the sample points such that each sample point is paired with one another. The program further comprises a
DETECTING AN EVENT FROM TIME-SERIES DATA SEQUENCES

CROSS-REFERENCE TO RELATED APPLICATIONS AND PRIORITY

The present application claims priority from Indian patent application 2074/MUM/2014 filed on Jun. 26, 2014.

TECHNICAL FIELD

The present subject matter described herein, in general, relates to detecting an event from time-series data sequences.

BACKGROUND

An event can be detected from time-series data sequences using several techniques known in the art. Generally the time-series data sequences extracted using a sensor comprise unique signal patterns corresponding to the event. For example, the event in case of a vehicle may be an abrupt braking of the vehicle, rapid rise/fall in acceleration/deceleration of the vehicle, change in direction of the vehicle and the like. The time series data sequences may be processed using techniques known in the art, for recognizing the unique signal patterns and further identifying the event based on the unique signal patterns.

Referring to FIG. 1a and FIG. 1b, the time-series data sequences captured using the sensor are illustrated, wherein x-axis represents time in seconds and y-axis represents values of speed. The FIG. 1a shows a time-series data sequence representing speed of the vehicle. A window 102 of the time-series data sequence highlights an event related to the vehicle. The event may be a hard-stop event related to the vehicle. During the hard-stop event while brakes are applied to the vehicle running at high speeds, the speed of the vehicle may reduce drastically. The unique signal pattern present in the time-series data sequence, as illustrated in the window 102, may be identified and thus the hard-stop event related to the vehicle may be determined. FIG. 1b shows a time-series data sequence representing speed of the vehicle in another case. Further, windows 104 highlight the unique signal patterns indicating the hard-stop events related to the vehicle, where speed of the vehicle reduces drastically.

SUMMARY

This summary is provided to introduce aspects related to systems and methods for detecting an event from time-series data sequences and the aspects are further described below in the detailed description. This summary is not intended to limit the scope of the subject matter.

In one implementation, a system for detecting an event from time-series data sequences is disclosed. The system comprises a processor and a memory coupled to the processor for executing a plurality of modules stored in the memory. The plurality of modules may comprise a pairing module, a matrix computing module, and a histogram generating and event determining (HGED) module. The pairing module may receive the time-series data sequences of variable lengths generated by a plurality of sensors, wherein the time-series data sequences may comprise timestamp information. The pairing module may sample the time-series data sequences at a uniform sampling rate, wherein the time-series data sequences may be sampled for generating sample points. The pairing module may generate a plurality of pairs program code for computing a distance matrix (D) and an angle matrix (A) for one or more pairs of the sample points of the plurality of pairs of sample points. The program further comprises a program code for generating a two-dimensional (2D) shape histogram for the time-series data sequence using the distance matrix (D) and the angle matrix (A). The 2D shape histograms having a constant dimension and represents global distribution of the plurality of pairs of sample points, and wherein the global distribution of the plurality of pairs of sample points is computed using the distance matrix (D) and the angle matrix (A). The program further comprises a program code for concatenating 2D shape histograms for the time-series data sequences based on the timestamp information to generate a concatenated shape histogram. The program further comprises a program code for matching the concatenated shape histogram with a pre-stored set of shape histograms to detect an event.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Systems and methods for detecting an event from time-series data sequences are described. The event may be detected from the time-series data sequences upon processing the time-series data sequences. In order to generate the time-series data sequences related to the event, a plurality of sensors may be used. The time-series data sequences generated by the sensors may comprise different waveform characteristics corresponding to the event. Further, the time-series data sequences may be of variable lengths and may also comprise timestamp information.

The time-series data sequences may be sampled at a uniform sampling rate. Further, the time-series data sequences may be sampled for generating sample points. Further, the sample points may be paired with one another to generate a plurality of pairs of sample points.

The time-series data sequences may be represented in a two-dimensional (2D) Euclidean space. The 2D Euclidean space may be used for computing Euclidean distances between the sample points of the plurality of pairs of sample points. The Euclidean distances may be used further for determining a distance matrix. The 2D Euclidean space may further be used for computing angles between the sample points of the plurality of pairs of sample points. The angles between the sample points may be used for determining an angle matrix.

The distance matrix and the angle matrix may be used for determining a global distribution of the plurality of pairs of sample points. The global distribution of the plurality of pairs of sample points may represent a 2D shape histogram, wherein the 2D shape histogram may be of constant dimension. The 2D shape histogram for the time-series data sequences may be concatenated using a linear concatenation technique for generating a concatenated shape histogram. Further, the timestamp information may be used for concatenating the 2D shape histograms.

The concatenated shape histogram may further be matched with a pre-stored set of shape histograms, using a Support Vector Machine (SVM) classifier, for recognizing the event. The pre-stored set of shape histograms may comprise 2D shape histograms associated with an identified category of the event.

While aspects of described system and method for detecting an event from time-series data sequences may be implemented in any number of different computing systems, environments, and/or configurations, the embodiments are described in the context of the following exemplary system.

Figure 1A:
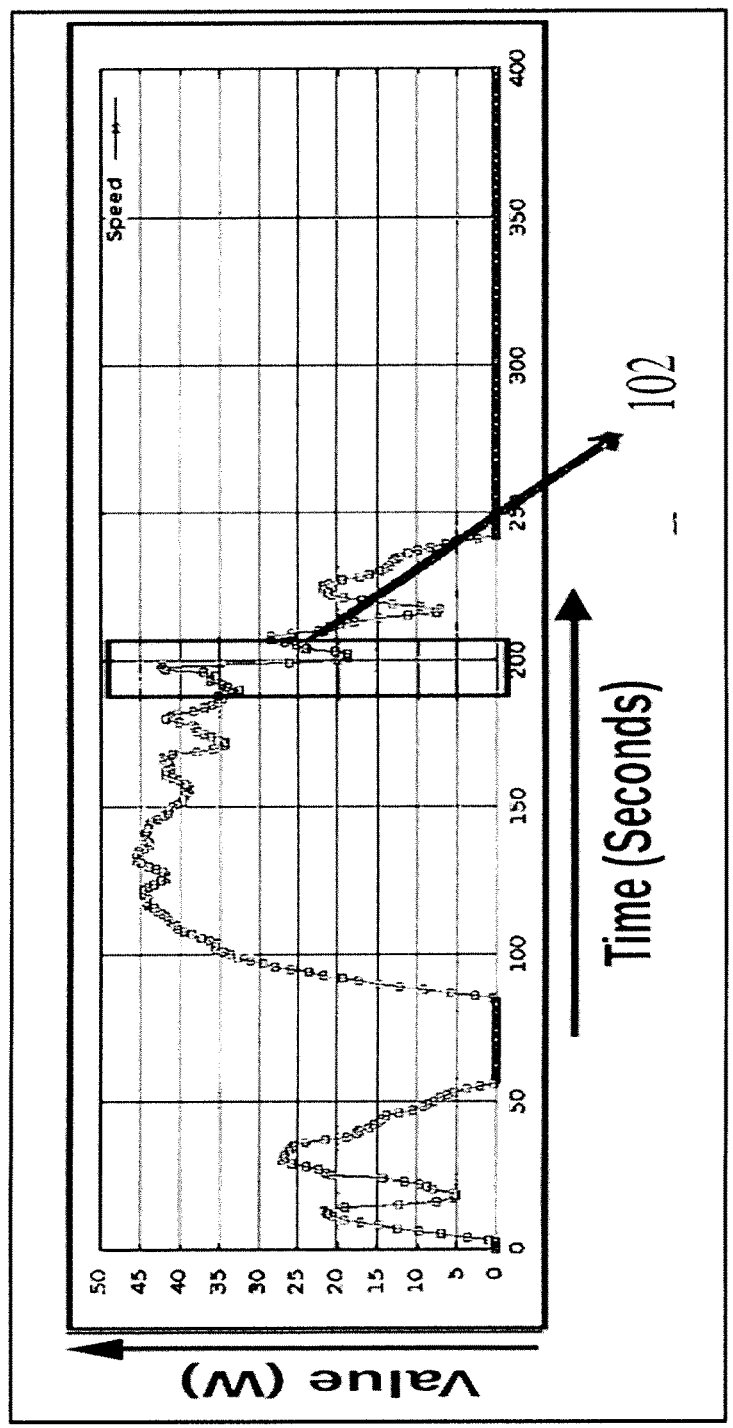
FIGS. 1a and 1b depict time-series data sequences captured using the sensor according to the prior art.
Figure 1B:
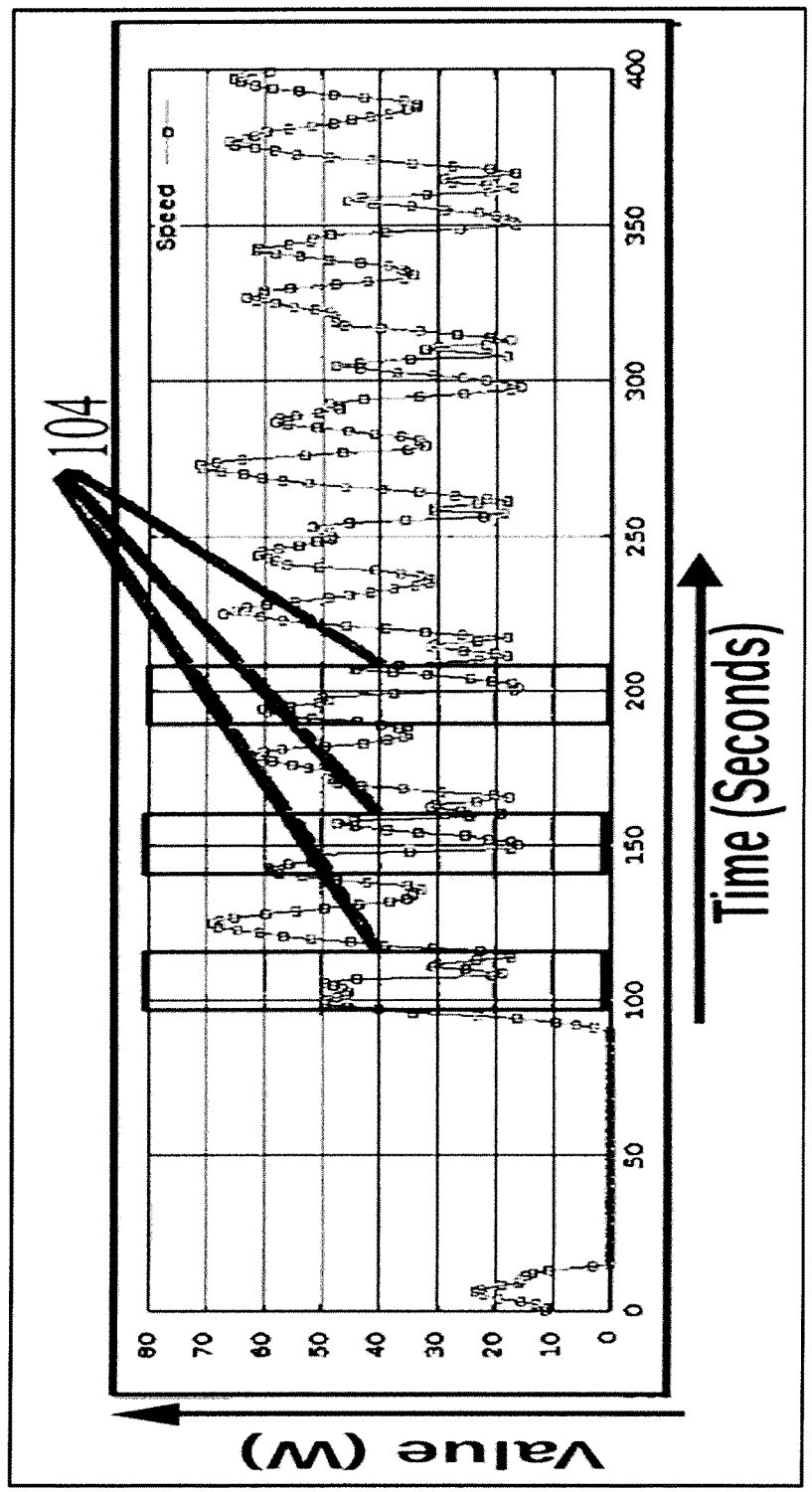
Figure 2:
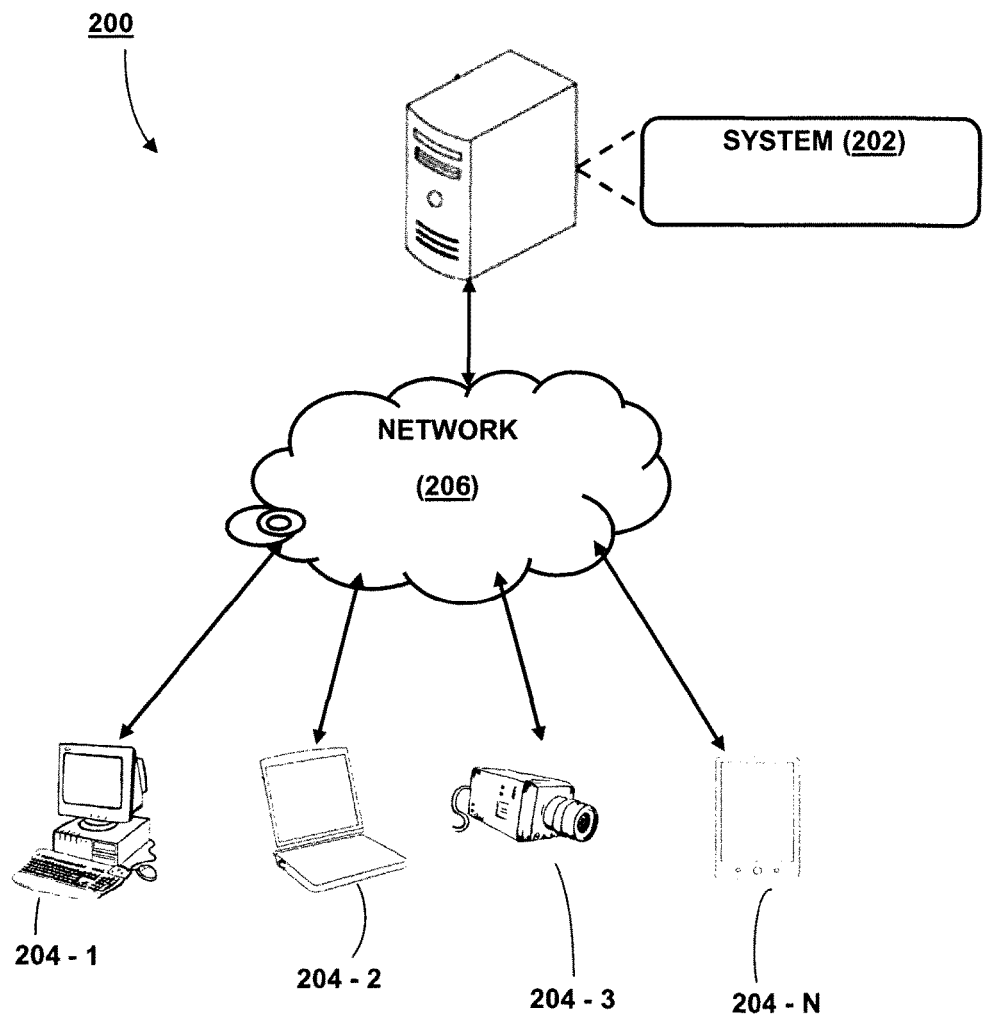
FIG. 2 illustrates a network implementation of a system for detecting an event from time-series data sequences, in accordance with an embodiment of the present subject matter.

Referring to FIG. 2, a network implementation 200 of a system 202 for detecting an event from time-series data sequences is illustrated, in accordance with an embodiment of the present subject matter. In one embodiment, the system 202 may facilitate the detection of an event from time-series data sequences. At first, the system 202 may employ sensors to capture the time-series data sequences. The time-series data sequences may be of variable lengths. The time-series data sequences may be sampled at a uniform sampling rate, wherein the time-series data sequences may be sampled for generating sample points. The system 202 may compute a global distribution of the plurality of pairs of sample points. The global distribution of the plurality of pairs of sample points may represent a 2D shape histogram for a time-series data sequence, wherein the 2D shape histogram may be of constant dimension. The system 202 may generate a concatenated shape histogram using the 2D shape histogram for each time-series data sequence. The system 202 may generate the concatenated shape histogram using the linear concatenation technique. Finally, the system 202 may detect the event by matching the concatenated shape histogram with the pre-stored set of shape histograms. The pre-stored set of shape histograms may comprise 2D shape histograms corresponding to relevant events.

Although the present subject matter is explained considering that the system 202 is implemented for detecting the event from the time-series data sequences, it may be understood that the system 202 may also be implemented in a variety of computing systems, such as a laptop computer, a desktop computer, a notebook, a workstation, a mainframe computer, a server, a network server, a tablet, a mobile phone, and the like. In one embodiment, the system 202 may be implemented in a cloud-based environment. It will be understood that the system 202 may be accessed by multiple users through one or more user devices 204-1, 204-2, 204-3, 204-N, collectively referred to as user device 204 hereinafter, or applications residing on the user device 204. Examples of the user device 204 may include, but are not limited to, a portable computer with a webcam, a personal digital assistant with a camera, a handheld device with a camera, and a digital camera. The user device 204 is communicatively coupled to the system 202 through a network 206.

In one implementation, the network 206 may be a wireless network, a wired network or a combination thereof. The network 206 can be implemented as one of the different types of networks, such as intranet, local area network (LAN), wide area network (WAN), the internet, and the like. The network 206 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 206 may include a variety of network devices, including routers, bridges, servers, computing devices, storage devices, and the like.

Figure 3:
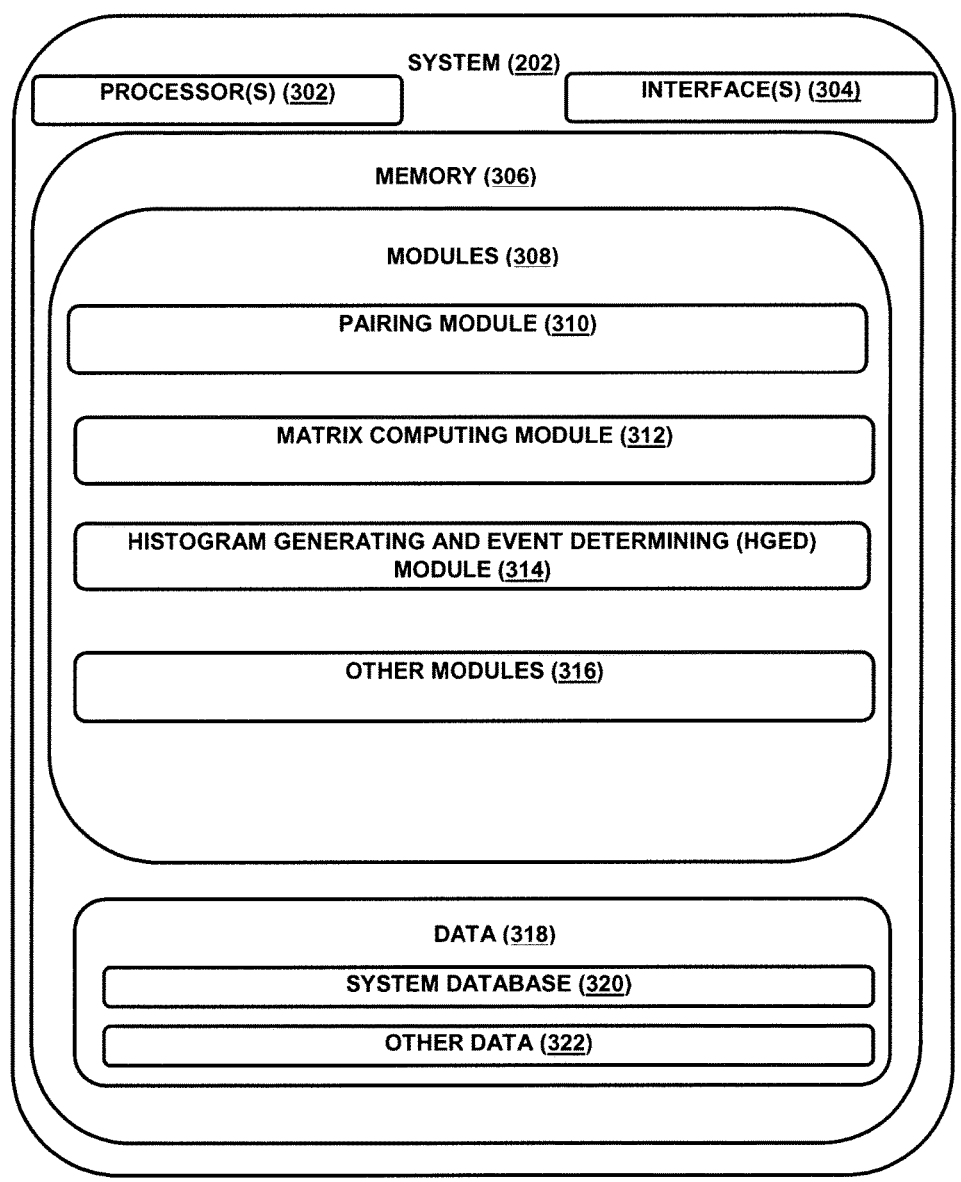
FIG. 3 illustrates the system of FIG. 2, in accordance with an embodiment of the present subject matter.

Referring now to FIG. 3, the system 202 is illustrated in accordance with an embodiment of the present subject matter. In one embodiment, the system 202 may include at least one processor 302, an input/output (I/O) interface 304, and a memory 306. The at least one processor 302 may be implemented as one or more microprocessors, microcomputers, microcontrollers, digital signal processors, central processing units, state machines, logic circuitries, and/or any devices that manipulate signals based on operational instructions. Further, the at least one processor 302 may comprise a multi-core architecture. Among other capabilities, the at least one processor 302 is configured to fetch and execute computer-readable instructions or modules stored in the memory 306.

The I/O interface 304 may include a variety of software and hardware interfaces, for example, a web interface, a graphical user interface, and the like. The I/O interface 304 may allow the system 202 to interact with a user directly or through the user devices 204. Further, the I/O interface 304 may enable the system 202 to communicate with other computing devices, such as web servers and external data servers (not shown). The I/O interface 304 can facilitate multiple communications within a wide variety of networks and protocol types, including wired networks, for example, LAN, cable, etc., and wireless networks, such as WLAN, cellular, or satellite. The I/O interface 304 may include one or more ports for connecting a number of devices to one another or to another server.

The memory 306 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes. The memory 306 may include modules 308 and data 318.

The modules 308 include routines, programs, objects, components, data structures, etc., which perform particular tasks or implement particular abstract data types. In one implementation, the modules 308 may include a pairing module 310, a matrix computing module 312, a histogram generating and event determining (HGED) module 314, and other modules 316. The other modules 316 may include programs or coded instructions that supplement applications and functions of the system 202.

The data 318, amongst other things, serves as a repository for storing data processed, received, and generated by one or more of the modules 308. The data 318 may also include a system database 320, and other data 322. The other data 322 may include data generated as a result of the execution of one or more modules in the other modules 316.

In one implementation, at first, the sensors may be positioned across an environment for detecting events related to the environment. For example, the sensors may be positioned across a vehicle for determining the events related to the vehicle. The events related to the vehicle may comprise an abrupt braking of the vehicle (hard-stop event), rapid rise/fall in acceleration/deceleration of the vehicle, change in direction of the vehicle, and the like. The sensors may capture data related to the event. The data captured by the sensors may be represented as time series data sequences. The time-series data sequences may comprise timestamp information.

Further, the time-series data sequences may be sampled at a uniform sampling rate wherein the time-series data sequences may be sampled for generating sample points. The time-series data sequences captured by the sensors may be of variable lengths such that the time duration of the time-series data sequences may vary. Thus, the time-series data sequences captured by the sensors (more than one sensor) may be used for determining the event related to the vehicle. The event may be determined accurately as the time-series data sequences from multiple sensors may be used.

Figure 4A:
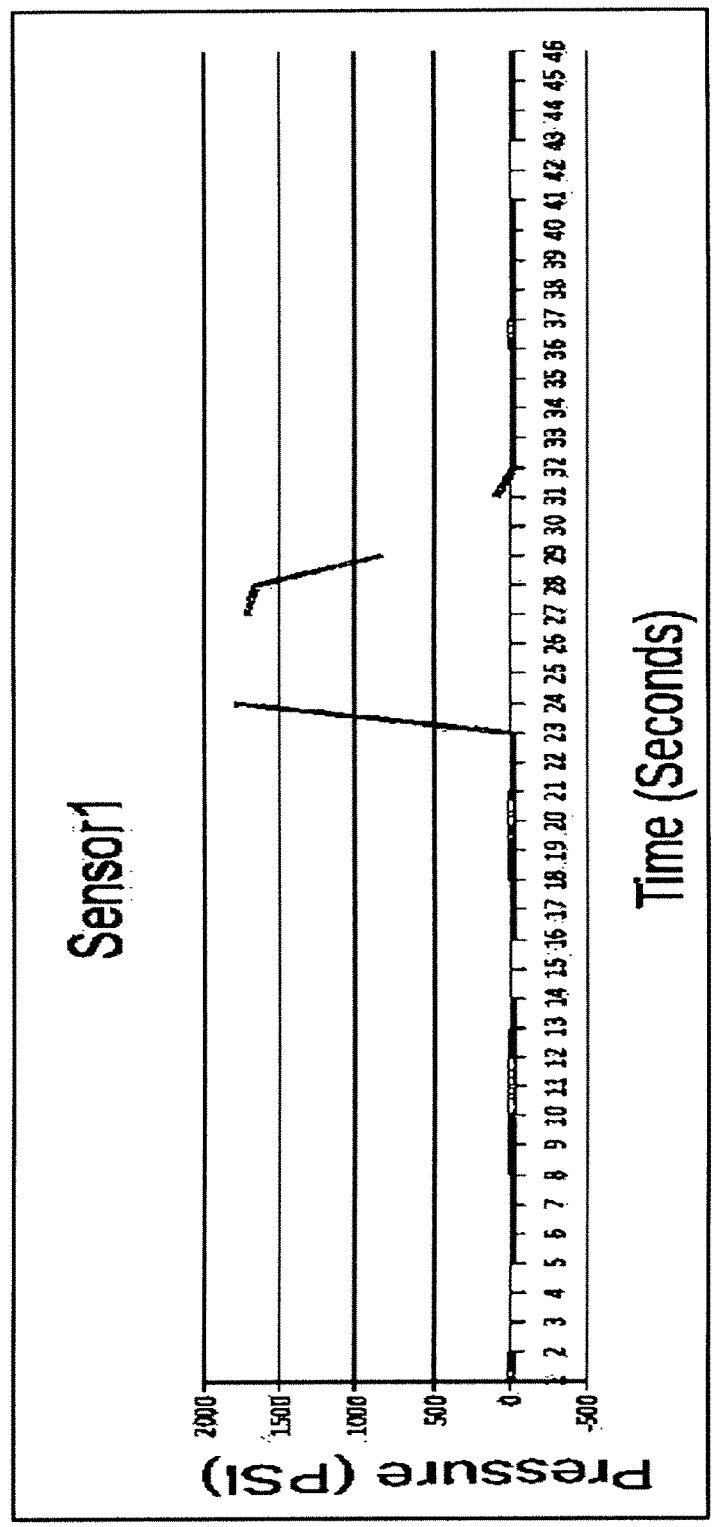
FIG. 4a illustrates a time-series data sequence S1 captured using a sensor 1 (pressure sensor), in accordance with an embodiment of the present subject matter.

In an example, a time-series data sequence S1 captured using a sensor 1 (pressure sensor) for a hard-stop event related to the vehicle is shown in FIG. 4a. In FIG. 4a, x-axis represents time (seconds) and y-axis represents brake cylinder pressure (Pounds per Square Inch, PSI). The time-series data sequence S1 represents a brake cylinder pressure of the vehicle during the hard-stop event. Further, the time-series data sequence S1 may include missing signal values during certain time intervals.

Figure 4B:
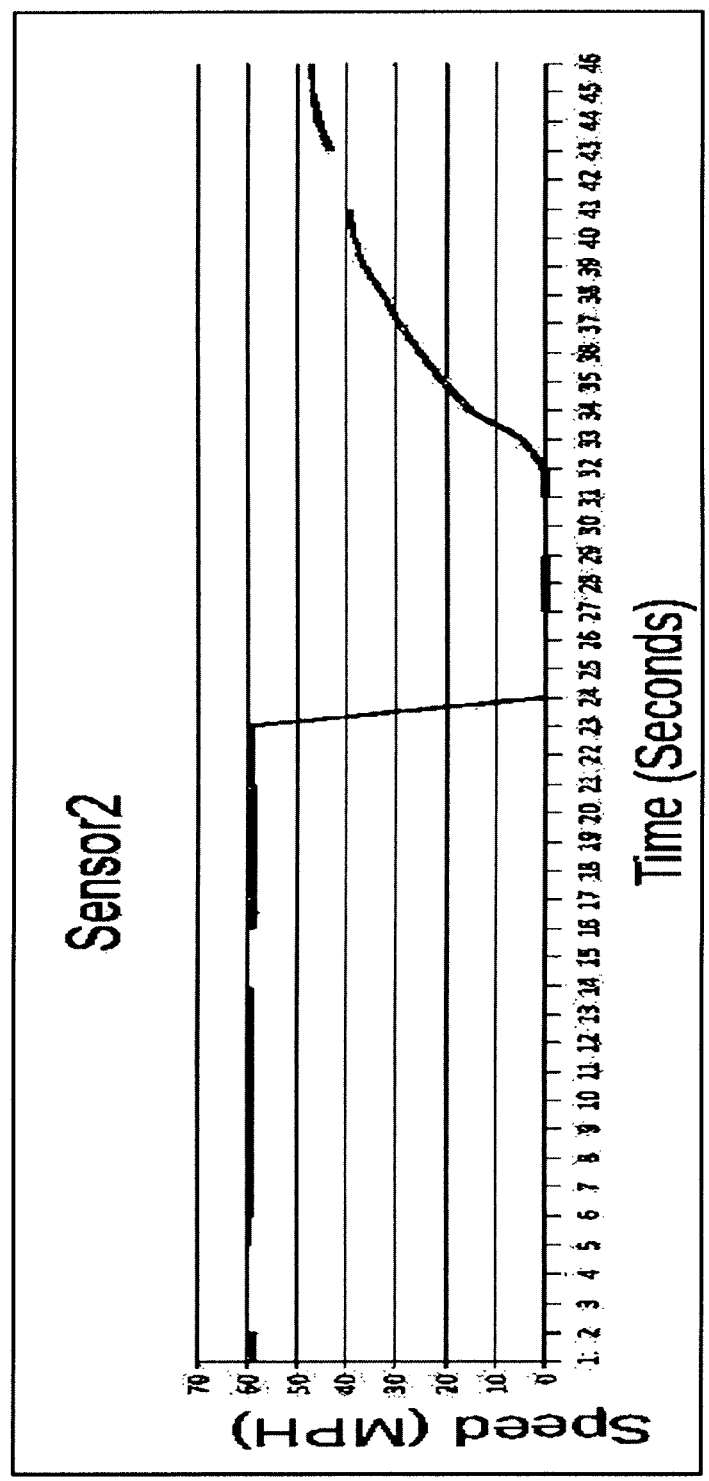
FIG. 4b illustrates a time-series data sequence S2 captured using a sensor 2 (speed sensor), in accordance with an embodiment of the present subject matter.

In an example, a time-series data sequence S2 captured using a sensor 2 (speed sensor) for the hard-stop event related to the vehicle is shown in FIG. 4b. In FIG. 4b, x-axis represents time (seconds) and y-axis represents speed (Miles per Hour, MPH). The time-series data sequence S2 represents a wheel speed of the vehicle, during the hard-stop event. Further, the time-series data sequence S2 may include missing signal values during certain time intervals.

Figure 4C:
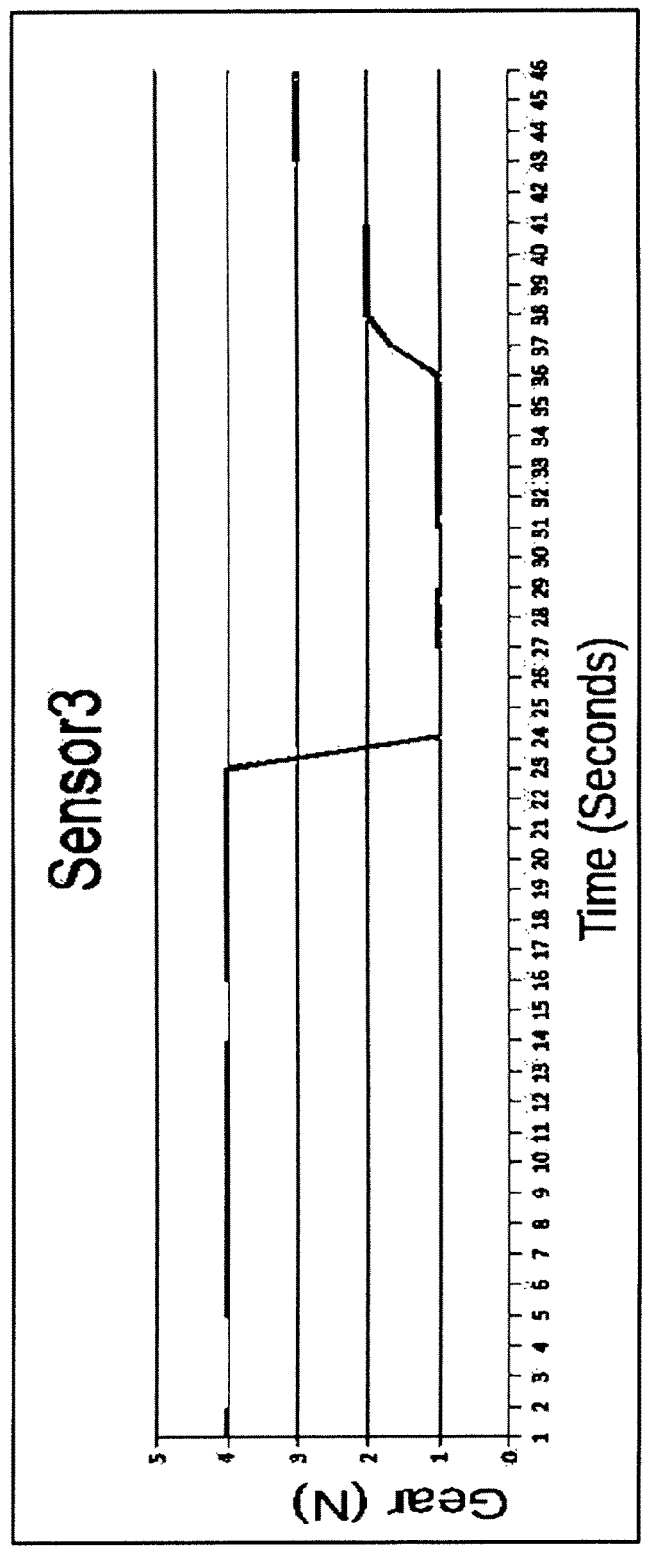
FIG. 4c illustrates a time-series data sequence S3 captured using a sensor 3 (gear sensor), in accordance with an embodiment of the present subject matter.

In an example, a time-series data sequence S3 captured using a sensor 3 (gear sensor) for a hard-stop event related to the vehicle is shown in FIG. 4c. In FIG. 4c, x-axis represents time (seconds) and y-axis represents a gear number (numbers, N). The time-series data sequence S3 represents a gear number related to the vehicle, during the hard-stop event. Further, the time-series data sequence S3 may include missing signal values during certain time intervals.

In an example, a signal pattern representing the hard-stop event of the vehicle may be determined using the sensor 1, the sensor 2, and the sensor 3 upon applying a predefined rule 1, as mentioned below, Rule 1={(Sensor 1 is greater than $s_1$)∩(Sensor 2 is greater than $s_2$)∩(Sensor 3 is in $[s_{31}, \ldots, s_{3m}]$)∩(drop in sensor 2 is greater than $s_2^*$)}

Here, $s_1$ denotes a positive pressure threshold value, $s_2$ denotes a positive speed threshold value, $[s_{31}, \ldots, s_{3m}]$ denotes the gear numbers, and $s_2^*$ denotes a negative speed threshold. The positive pressure threshold value may refer to a maximum threshold value of the sensors and the negative speed threshold may refer to a minimum threshold value of the sensors.

In another example, extreme boundaries (left boundary and right boundary) of the signal pattern indicative of the event may be defined by a rule 2, as mentioned below, Rule 2=Left boundary: {(Sensor 1 is less than $s_1$ for consecutive $t_1$ time)∪(c seconds before a critical point)}

Right boundary: {(Sensor 1 is less than d for consecutive e seconds)∩(sensor 2 is greater than f for consecutive g seconds)∪(35 sample points before the critical point)}

Post capturing the time-series data sequences of variable lengths by the sensors, the system 202 may employ the pairing module 310 to receive the time-series data sequences of variable lengths. The pairing module 310 may further pair the sample points for generating the plurality of pairs of sample points. Each sample point may be paired with one another to generate the plurality of pairs of sample points. The number of pairs (P) of sample points generated for a time-series data sequence S2 comprising number of sample points may be calculated using an below mentioned equation 1, $$P = {}^L C_2 \quad \text{Equation 1}$$

Figure 5:
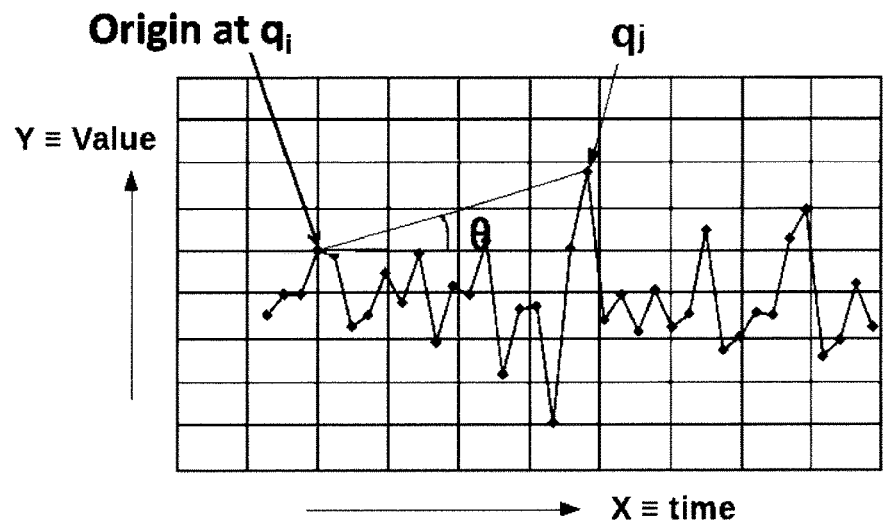
FIG. 5 illustrates a time-series data sequence S4 represented in two-dimensional (2D) Euclidean space.

After determining the pairs of sample points, the matrix computing module 312 may represent the time-series data sequences in a two-dimensional (2D) Euclidean space, as shown in FIG. 5. According to FIG. 5 an x-axis represents a time (t) of a time-series data sequence S4 and y-axis denotes value (w) of the time-series data sequence S4. The time-series data sequence S4 may comprise a pair of sample points generated between sample points '$q_i$' and '$q_j$'. The sample point '$q_i$' may be located at ($w_i$, $t_i$) and the sample point '$q_j$' may be located at ($w_j$, $t_j$) in the 2D Euclidean space. The matrix computing module 312 may compute the Euclidean distance (d) between the sample points '$q_i$' and '$q_j$' present in the pair of sample points '$q_i$-$q_j$', in the 2D Euclidean space using a below mentioned equation 2, $$d = \sqrt{(w_i - w_j)^2 + (t_i - t_j)^2} \quad \text{Equation 2}$$

Similarly, the matrix computing module 312 may compute the Euclidean distances for each pair of the plurality of pairs of the sample points. The Euclidean distances for each pair of the plurality of pairs of the sample points may be represented as a distance matrix.

Post computing the distance matrix, the matrix computing module 312 may normalize the distance matrix by dividing the Euclidean distances present in one or more rows of the distance matrix with a maximum Euclidean distance present in the one or more rows. The normalization of the distance matrix may convert the distance matrix into [0, 1] scale.

Further, the matrix computing module 312 may compute angles between the sample points of the pairs of sample points. For example, an angle '0' between the sample points '$q_i$' (origin point) and '$q_j$' may be computed, as shown in FIG. 5. Similarly, the angles between the sample points of each pair of the plurality of pairs may be computed. The angles between the sample points of each pair of the plurality of pairs may be represented as an angle matrix.

Post determining the distance matrix and the angle matrix, the matrix computing module 312 may quantize the Euclidean distances and the angles. The Euclidean distances and the angles may be quantized for splitting the Euclidean distances and the angles into bins. Thus, in an example, upon quantizing the Euclidean distances into 'm' levels, the Euclidean distances may be represented as $[d_0, d_1] \cup [d_1, d_2] \ldots \cup [d_{m-1}, d_m]$. Here $[d_0, d_1]$, $[d_1, d_2]$, and $[d_{m-1}, d_m]$ may represent distance bins. Similarly, in an example, upon quantizing the angles into 'n' levels the angles may be represented as $[\alpha_0, \alpha_1] \cup [\alpha_1, \alpha_2] \ldots \cup [\alpha_{n-1}, \alpha_n]$. Here $[\alpha_0, \alpha_1] \cup [\alpha_1, \alpha_2] \ldots \cup [\alpha_{n-1}, \alpha_n]$ may represent angle bins.

After employing the matrix computing module 312, the system 202 may employ the histogram generating and event determining (HGED) module 314. The HGED module 314 may generate a two-dimensional (2D) shape histogram for the time-series data sequence. The 2D shape histogram may represent a global distribution of the plurality of pairs of sample points. The global distribution of the plurality of pairs of sample points may be computed using the distance matrix (D) and the angle matrix (A). The HGED module 314 may compute the global distribution of the plurality of pairs of sample points by computing a shape context of each sample point. The shape context may be defined by a distance-angle based distribution of each sample point with respect to other sample points. In an example, the HGED module 314 may compute the bin (p, q) of the shape context ($h_i$) of a sample point '$q_i$' using a below mentioned equation 3, $$h_i(p, q) = \sum_{j=1, j \neq i}^{l} \delta(D_{i,j}, A_{i,j}, d_{p-1}, d_p, \alpha_{q-1}, \alpha_q), \quad \text{Equation 3}$$

Here, $$\delta(D_{i,j}, A_{i,j}, d_{p-1}, d_p, \alpha_{q-1}, \alpha_q) = \begin{cases} 1 & \text{if } D_{i,j} \in [d_{p-1}, d_p], A_{i,j} \in [\alpha_{q-1}, \alpha_q] \\ 0 & \text{otherwise} \end{cases}$$

The HGED module 314 may add the shape contexts of the sample points of the plurality of pairs of sample points for computing a cumulative shape histogram ($h_{sum}$). The cumulative shape histogram may define the global distribution of the plurality of pairs of sample points. The bins of the cumulative shape histograms ($h_{sum}$) may represent the count of the plurality of pairs of sample points. In one example, the bin (p, q) may represent the count of the plurality of pairs of sample points arranged within the Euclidean distance $[d_{p-1}, d_p]$ and within the angle $[\alpha_{q-1}, \alpha_q]$. Further, the HGED module 314 may divide cumulative histogram ($h_{sum}$) by a maximum entry for generating the 2D shape histogram. Further, the HGED module 314 may generate the 2D shape histogram corresponding to the each time-series data sequence generated by the plurality of sensors, wherein the 2D shape histogram may be of constant dimension.

Figure 6A:
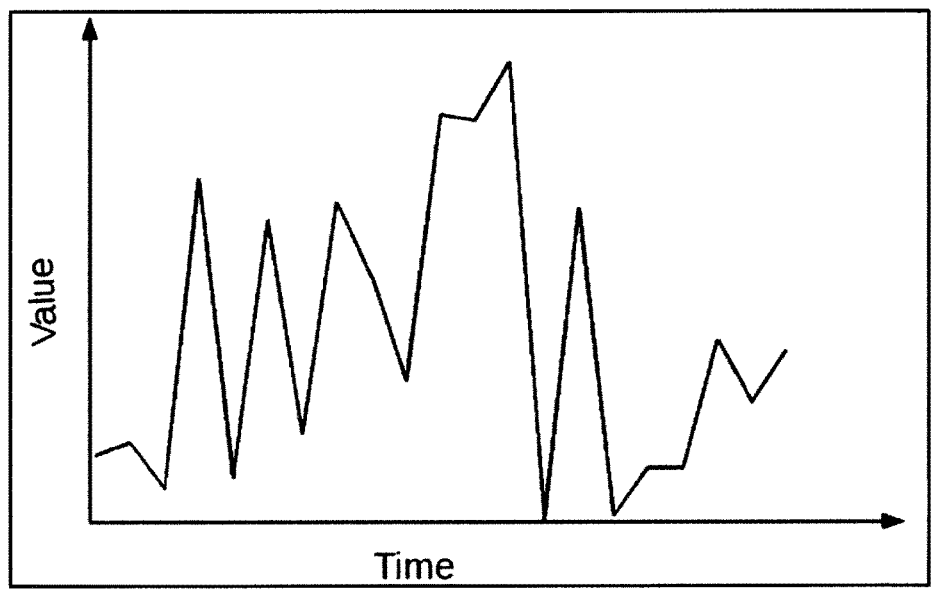
FIG. 6a illustrates a time-series data sequence S5 captured using a sensor.
Figure 6B:
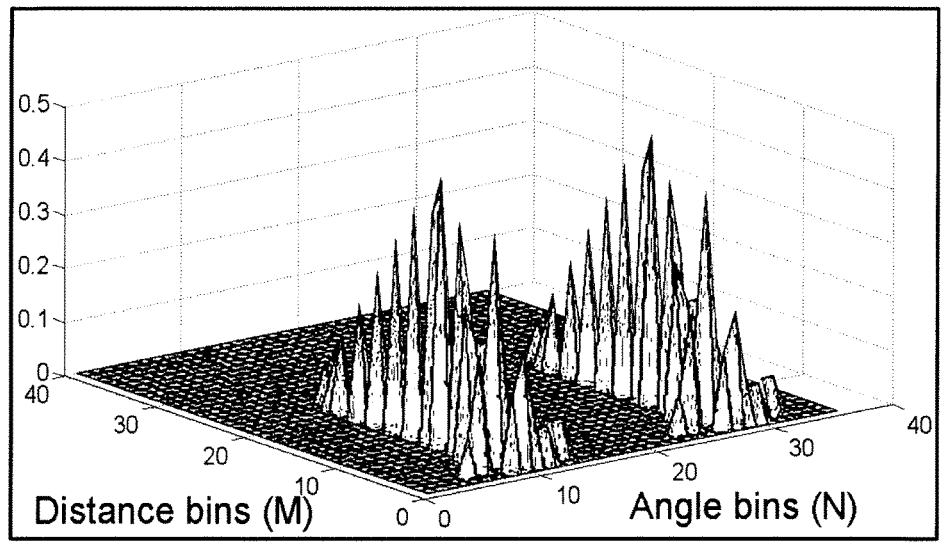
FIG. 6b illustrates the 2D shape histogram corresponding to the time-series data sequence S5.

FIG. 6a illustrates an example of the time-series data sequence S5 and FIG. 6b illustrates the 2D shape histogram corresponding to the time-series data sequence S5 generated by the system 202. Here, the number of distance bins (m) is considered as 40 and number of angle bins (n) is considered as 36.

Figure 7A:
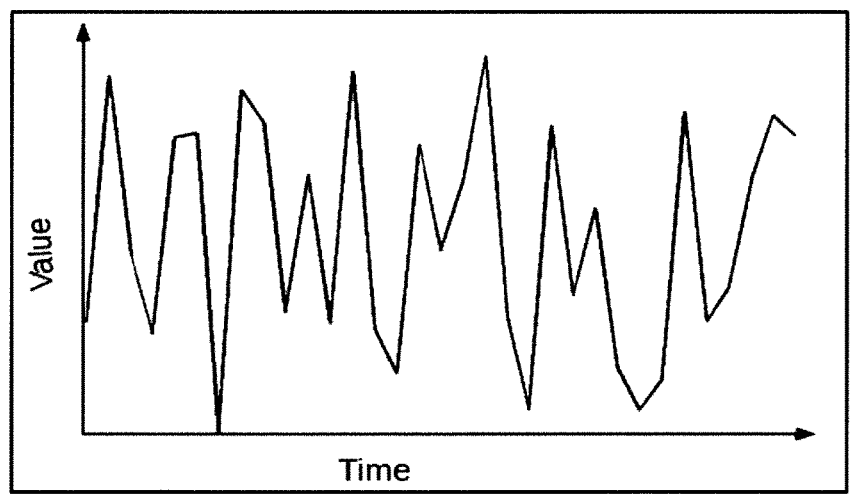
FIG. 7a illustrates a time-series data sequence S6 captured using a sensor.
Figure 7B:
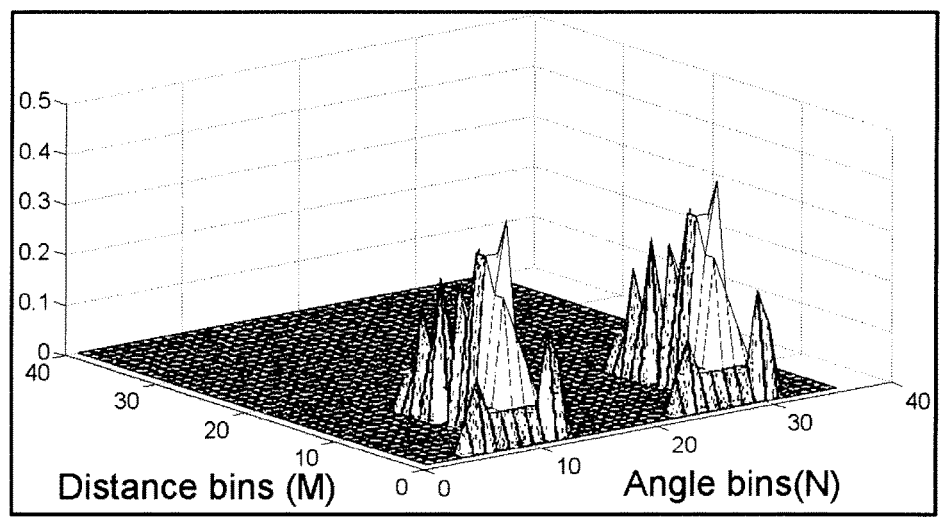
FIG. 7b illustrates the 2D shape histogram corresponding to the time-series data sequence S6.

FIG. 7a illustrates an example of the time-series data sequence S6 and FIG. 7b illustrates the 2D shape histogram corresponding to the time-series data sequence S6 generated by the system 202. Here, the number of distance bins (m) is considered as 40 and number of angle bins (n) is considered as 36.

Post generating the 2D shape histogram for the time-series data sequence generated by the plurality of sensors, the HGED module 314 may concatenate the 2D shape histogram for each time-series data sequence based on the timestamp information for generating a concatenated shape histogram. Further, the 2D shape histograms for the time-series data sequences comprising proximate timestamp information may be concatenated for generating the concatenated shape histogram. The HGED module 314 may employ a linear concatenation technique for generating the concatenated shape histogram. The HGED module 314 may bring together the bins of the shape histograms and may increase the number of dimensions of the feature vector. In an example, the HGED module 314 may convert the distance matrix and the angle matrix of the 2D shape histogram corresponding to the time-series data sequence S5 into one-dimensional (1D) vectors. The HGED module 314 may also convert the distance matrix and the angle matrix of the 2D shape histogram corresponding to the time-series data sequence S6 into one-dimensional (1D) vectors. Further, the HGED module 314 may adjoin the 1D vectors of the time-series data sequence S5 with the 1D vectors of the time-series data sequence S6. The HGED module 314 may adjoin the 1D vectors for employing a linear concatenation technique. Upon employing the linear concatenation technique by the HGED module 314, a concatenated shape histogram may be generated by the HGED module 314.

Thus, the 2D shape histogram for the time-series data sequences derived from sensors employed in the vehicle/environment, may be concatenated by the HGED module 314. Concatenating the 2D shape histogram for the time-series data sequences may bring together the discriminating features of the 2D shape histogram for the time-series data sequences. Thus, concatenating the 2D shape histogram for the time-series data sequences may improve the accuracy of detecting the event related to the vehicle/environment.

Further, the HGED module 314 may match the concatenated shape histogram with a pre-stored set of shape histograms for detecting the event. The pre-stored set of shape histograms may comprise shape histograms corresponding to relevant events. In an example, the HGED module 314 may match the concatenated shape histogram with the pre-stored set of shape histograms using a Support Vector Machine (SVM) classifier. However, in a case, the HGED module 314 may use Radial Basis Function (RBF) kernel with the SVM classifier for matching the concatenated shape histogram with the pre-stored set of shape histograms. Upon determining a successful match of the concatenated shape histogram, the HGED module 314 may determine the event.

Figure 8:
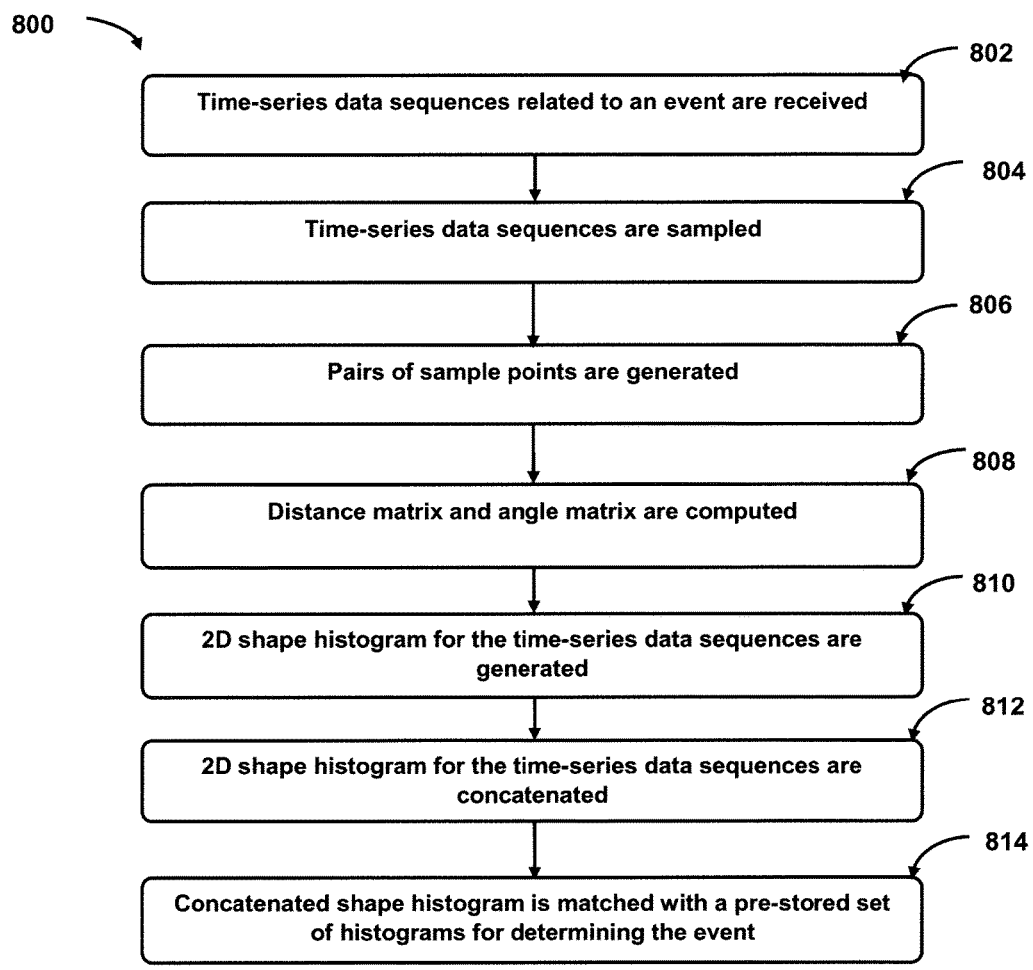
FIG. 8 shows a flowchart illustrating a method for detecting an event from time-series data sequences, in accordance with an embodiment of the present subject matter.

Referring now to FIG. 8, the method for detecting an event from time-series data sequences, in accordance with an embodiment of the present subject matter. The method 800 may be described in the general context of computer executable instructions. Generally, computer executable instructions can include routines, programs, objects, components, data structures, procedures, modules, functions, etc., that perform particular functions or implement particular abstract data types. The method 800 may also be practiced in a distributed computing environment where functions are performed by remote processing devices that are linked through a communications network. In a distributed computing environment, computer executable instructions may be located in both local and remote computer storage media, including memory storage devices.

The order in which the method 800 is described is not intended to be construed as a limitation, and any number of the described method blocks can be combined in any order to implement the method 800 or alternate methods. Additionally, individual blocks may be deleted from the method 800 without departing from the spirit and scope of the subject matter described herein. Furthermore, the method 800 can be implemented in any suitable hardware, software, firmware, or combination thereof. However, for ease of explanation, in the embodiments described below, the method 800 may be considered to be implemented in the above described system 202.

At block 802, the time-series data sequences related to an event are received. Further, the step of receiving time-series data sequences related to the event may be performed by a processor.

At block 804, the time-series data sequences are sampled. The time-series data sequences are sampled for generating sample points. Further, the step of sampling the time-series data sequences may be performed by a processor.

At block 806, the pairs of sample points are generated. Further, each of the sample point may be paired with one another. Further, the step of generating pairs of sample points is performed by the processor.

At block 808, the distance matrix and the angle matrix are computed. Further the distance matrix and the angle matrix are computed in a 2D Euclidean space. Further, the step of computing the distance matrix and the angle matrix is performed by the processor.

At block 810, the 2D shape histogram for the time-series data sequences are generated, wherein the 2D shape histogram for the time-series data sequences represent global distribution of the plurality of pairs of sample points. The global distribution of the plurality of pairs of sample points is computed using the distance matrix (D) and the angle matrix (A). Further, the step of generating the 2D shape histograms is performed by the processor.

At block 812, the 2D shape histogram for the time-series data sequences are concatenated. Further, the 2D shape histogram for the time-series data sequences are concatenated using a linear concatenation technique for generating a concatenated shape histogram. Further, the step of concatenating the 2D shape histogram for the time-series data sequences is performed by the processor.

At block 814, the concatenated shape histogram is matched with a pre-stored set of histograms for determining the event. Further, the step of matching the concatenated shape histogram with the pre-stored shape histograms, for determining the event, is performed by the processor.

Although implementations for detecting an event from time-series data sequences have been described in language specific to structural features and/or methods, it is to be understood that the appended claims are not necessarily limited to the specific features or methods described. Rather, the specific features and methods are disclosed as examples of implementations for monitoring the user activities on the software application external to an organization.

We claim:

1. A method for detecting an event from time-series data sequences, the method comprising:
   receiving, by a processor, the time-series data sequences of variable lengths, generated by a plurality of sensors, wherein the time-series data sequences comprise timestamp information;
   sampling the time-series data sequences at a uniform sampling rate for generating sample points;
   generating, by the processor, a plurality of pairs of sample points using the sample points, wherein the plurality of pairs of sample points are generated by pairing each sample point with one another;
   computing, by the processor, a distance matrix (D) and an angle matrix (A) for one or more pairs of the sample points of the plurality of pairs of sample points;
   generating, by the processor, a two-dimensional (2D) shape histogram for the time-series data sequences using the distance matrix (D) and the angle matrix (A), wherein the 2D shape histogram have a constant dimension and the 2D shape histogram represents a global distribution of the plurality of pairs of sample points, wherein the global distribution of the plurality of pairs of sample points is obtained by computing a shape context of each sample point and wherein the shape context of each sample point is defined based on a distance-angle based distribution of each sample point with respect to remaining sample points;
   concatenating, by the processor, the 2D shape histograms for one or more time-series data sequences based on the timestamp information to generate a concatenated shape histogram; and
   matching, by the processor, the concatenated shape histogram with a pre-stored set of shape histograms to detect an event.

2. The method of claim 1, wherein the distance matrix (D) is computed by calculating Euclidean distances between the sample points present in the pairs of the sample points, and wherein the Euclidean distances are computed in a two-dimensional Euclidean space.

3. The method of claim 2 further comprising normalizing the distance matrix (D) by dividing the Euclidean distances of one or more rows with a maximum Euclidean distance of the one or more rows.

4. The method of claim 1, wherein the angle matrix (A) is computed by calculating angles between the sample points present in the pairs of the sample points, and wherein the angles are computed in a two-dimensional Euclidean space.

5. The method of claim 1, wherein the 2D shape histograms for the one or more time-series data sequences comprising proximate timestamp information are concatenated to generate the concatenated shape histogram, and concatenating of the 2D shape histograms brings together discriminating features of the 2D shape histograms for the one or more time-series data sequences.

6. The method of claim 1, wherein the concatenated shape histogram is generated by converting the distance matrix (D) and the angle matrix (A) into one-dimensional vectors and merging the one-dimensional (1 D) vectors.

7. The method of claim 1, wherein the concatenated shape histogram is matched with the pre-stored set of shape histograms using a Support Vector Machine (SVM) classifier.

8. The method of claim 1, wherein the pre-stored set of shape histograms comprise shape histograms corresponding to a relevant event.

9. A system for detecting an event from time-series data sequences, the system comprising:
   a processor;
   a memory coupled to the processor, wherein the processor is capable for executing a plurality of modules stored in the memory, and wherein the plurality of modules comprising:
      a pairing module,
         to receive the time-series data sequences of variable lengths generated by a plurality of sensors, wherein the time-series data sequences comprise timestamp information;
         to sample the time-series data sequences at a uniform sampling rate for generating sample points;
         to generate a plurality of pairs of sample points using the sample points such that each sample point is paired with one another; a matrix computing module,
         to compute a distance matrix (D) and an angle matrix (A) for one or more pairs of the sample points of the plurality of pairs of sample points;
      a histogram generating and event determining (HGED) module,
      to generate a two-dimensional (2D) shape histogram for the time-series data sequences using the distance matrix (D) and the angle matrix (A), wherein the 2D shape histogram have a constant dimension, and the 2D shape histogram represents global distribution of the plurality of pairs of sample points, wherein the global distribution of the plurality of pairs of sample points is obtained by computing a shape context of each sample point and wherein the shape context of each sample point is defined based on a distance-angle based distribution of each sample point with respect to remaining sample points;
      to concatenate the 2D shape histograms for one or more time-series data sequences based on the timestamp information to generate a concatenated shape histogram; and
      to match the concatenated shape histogram with a pre-stored set of shape histograms to detect an event.

10. The system of claim 9, wherein the distance matrix (D) is computed by calculating Euclidean distances between the sample points present in the pairs of the sample points, and wherein the Euclidean distances are computed in a two-dimensional Euclidean space.

11. The system of claim 10, wherein the matrix computing module further normalizes the distance matrix (D) by dividing the Euclidean distances of one or more rows with a maximum Euclidean distance of the one or more rows.

12. The system of claim 9, wherein the angle matrix (A) is computed by calculating angles between the sample points present in the pairs of the sample points, and wherein the angles are computed in a two-dimensional Euclidean space.

13. The system of claim 9, wherein the time-series data sequences comprising proximate timestamp information are concatenated to generate the concatenated shape histogram, and concatenating the 2D shape histograms brings together discriminating features of the 2D shape histograms for the one or more time-series data sequences.

14. The system of claim 9, wherein the concatenated shape histogram is generated by converting the distance matrix (D) and the angle matrix (A) into one-dimensional vectors and merging the one-dimensional (1D) vectors.

15. The system of claim 9, wherein the concatenated shape histogram is matched with the pre-stored set of shape histograms using a Support Vector Machine (SVM) classifier.

16. The system of claim 9, wherein the pre-stored set of shape histograms comprise shape histograms corresponding to a relevant event.

17. A non-transitory computer readable medium embodying a program executable in a computing device for detecting an event from time-series data sequences, the program comprising:
- a program code for receiving the time-series data sequences of variable lengths generated by a plurality of sensors, wherein the time-series data sequences comprise timestamp information;
- a program code for sampling the time-series data sequences at a uniform sampling rate for generating sample points;
- a program code for generating a plurality of pairs of sample points using the sample points such that each sample point is paired with one another,
- a program code for computing a distance matrix (D) and an angle matrix (A) for one or more pairs of the sample points of the plurality of pairs of sample points;
- a program code for generating a two-dimensional (2D) shape histogram for the time-series data sequences using the distance matrix (D) and the angle matrix (A), wherein the 2D shape histogram have a constant dimension, and the 2D shape histogram represents global distribution of the plurality of pairs of sample points, wherein the global distribution of the plurality of pairs of sample points is obtained by computing a shape context of each sample point, wherein the global distribution of the plurality of pairs of sample points is obtained by computing a shape context of each sample point and wherein the shape context of each sample point is defined based on a distance-angle based distribution of each sample point with respect to remaining sample points;
- a program code for concatenating 2D shape histograms for one or more time-series data sequences based on the timestamp information to generate a concatenated shape histogram; and
- a program code for matching the concatenated shape histogram with a pre-stored set of shape histograms to detect an event.

* * * * *